(12) United States Patent
Okai et al.

(10) Patent No.: US 7,423,405 B2
(45) Date of Patent: Sep. 9, 2008

(54) ELECTROMAGNETIC ROTATING MACHINE

(75) Inventors: Keiichi Okai, Tokyo (JP); Takeshi Tagashira, Tokyo (JP); Ryoji Yanagi, Tokyo (JP); Hiroshi Nomura, Tokyo (JP)

(73) Assignees: Japan Aerospace Exploration Agency, Tokyo (JP); Nihon University, Tokyo (JP)

( * ) Notice: Subject to any disclaimer, the term of this patent is extended or adjusted under 35 U.S.C. 154(b) by 298 days.

(21) Appl. No.: 11/336,830

(22) Filed: Jan. 23, 2006

(65) Prior Publication Data
US 2006/0176009 A1 Aug. 10, 2006

(30) Foreign Application Priority Data
Jan. 25, 2005 (JP) .............................. 2005-016537

(51) Int. Cl.
*H02P 1/24* (2006.01)
(52) U.S. Cl. ................... 318/727; 318/751; 318/752; 310/216; 310/154.03; 310/154.09; 310/89
(58) Field of Classification Search ................. 318/254, 318/727, 751, 752; 310/156, 216, 154.03, 310/154.09, 89
See application file for complete search history.

(56) References Cited

U.S. PATENT DOCUMENTS

| 3,599,062 | A | * | 8/1971 | Crane et al. ................... 318/281 |
| 3,914,629 | A | * | 10/1975 | Gardiner ....................... 310/46 |
| 4,323,806 | A | * | 4/1982 | Aoki ........................... 310/266 |
| 4,450,396 | A | * | 5/1984 | Thornton ...................... 318/721 |
| 4,672,284 | A | * | 6/1987 | Ward ........................... 318/752 |
| 4,761,002 | A | * | 8/1988 | Reed et al. .................... 271/111 |
| 4,761,602 | A | * | 8/1988 | Leibovich ..................... 318/816 |
| 5,038,091 | A | * | 8/1991 | Bashark ....................... 318/809 |
| 5,650,697 | A | * | 7/1997 | Imagi et al. ............... 318/400.3 |
| 5,796,234 | A | * | 8/1998 | Vrionis ........................ 318/751 |
| 6,121,749 | A | * | 9/2000 | Wills et al. ................... 318/811 |
| 6,175,208 | B1 | * | 1/2001 | Rose ........................... 318/751 |
| 6,242,884 | B1 | * | 6/2001 | Lipo et al. ................... 318/808 |
| 6,445,101 | B2 | * | 9/2002 | Ley ............................. 310/184 |
| 6,566,841 | B2 | * | 5/2003 | Bush et al. ................... 318/771 |
| 6,844,639 | B2 | * | 1/2005 | Lacaze ...................... 310/68 R |
| 2008/0093950 | A1 | * | 4/2008 | Cros et al. ................... 310/257 |

OTHER PUBLICATIONS

NASA. Magnetically Levitated Ducted Fan Being Developed as a Propulsor Option for Electric Flight, http://www.grc.nasa.gov/WWW/RT/2003/7000/7720emerson.html.

* cited by examiner

*Primary Examiner*—Rita Leykin
(74) *Attorney, Agent, or Firm*—Westerman, Hattori, Daniels & Adrian, LLP.

(57) ABSTRACT

In order to obtain an electromagnetic rotating machine of lightweight and high energy efficiency, which produces big torque for rotating a large-diameter fan, a coil A and coil B as excitation coils are disposed on an inner peripheral surface of a fan casing so as to face an outer circumference of the fan, and a coil M as an armature coil crosses at a central portion and is disposed on the outer circumference of the fan. The relationships $|I_{ai}|=|I_{ai+1}|$ and $I_{ai}=-I_{ai+1}$, or $|I_{bi}|=|I_{bi+1}|$ and $I_{bi}=-I_{bi+1}$ are obtained respectively for the coil A or coil B by a current control device (not shown). Moreover, the coil A and coil B are subjected to excitation control such that the direction of effective electromagnetic force, which is generated by an interaction between an effective magnetic field formed by the coil A and effective induced current applied to the coil M by the coil B, corresponds to the direction of rotation of the fan.

10 Claims, 8 Drawing Sheets

ELECTROMAGNETIC ROTATING MACHINE

BACKGROUND OF THE INVENTION

1. Field of the Invention

The present invention relates to an electromagnetic rotating machine, and particularly to an electromagnetic rotating machine which is preferred for a turbofan mounted in an airplane.

2. Description of the Related Art

In a conventional aircraft jet propeller, i.e. turbojet engine, the pressure of the air taken in from an inlet is increased by a compressor, thus obtained compressed air is intermixed with fuel, which is then combusted by a combustor and injected backwards as high-temperature and pressure gas, and propulsion is obtained by means of the reaction force produced by the injection. On the other hand, there is a turbofan engine and the like in which some of the breathed air is caused to bypass and pass through a fan only without being sent to the core engine that consists of a compressor, combustor, and turbine, the flow speed of the air is increased by means of the fan, and then the air is injected backwards, thereby obtaining propulsion. Particularly, the turbofan engines in which the amount of air sent to the fan is larger than that in core engines are also called "high bypass-ratio turbofan engine," which are used in regions of the speed lower than the sound speed, have high fuel consumption efficiency, have low emission since a large portion of the breathed air is not combusted, and are low noise since bypass airflow covers the combustion gas. For this reason, the high bypass-ratio turbofan engines respond to the needs of the age in terms of energy conservation and elimination of environmental destruction such as global warming and acid rain, and are used frequently as civil aircraft engines or cargo aircraft engines.

Further, while the industrial structures have been globalized or become borderless, demand for civil aircraft or cargo aircraft tends to grow, and at the same time the number of passengers and cargo transportation volume tend to increase, thus high thrust turbofan engines with a larger fan diameter for civil aircraft or cargo aircraft are needed. Motive power that produces big torque is required in order to drive a fan with a large diameter. Therefore, there is adopted a method of driving the fan by providing an external power unit, i.e. an electric motor, and using the torque of the electric motor. For the sake of reference, Japanese Patent Application Laid-Open No. H10-018860 discloses a method of obtaining driving force from an electric motor.

However, in order to produce big torque when driving a fan with an electric motor, a magnetic field system which generates a large magnetic field, and an electric generating system with large capacity which passes high current through an armature coil are required. Moreover, there is a problem that the weight of the engine section increases due to the iron-core structure of the armature.

Incidentally, if a lightweight electric motor with low power consumption is devised, the above problems are resolved. Generally, when current (I) is applied to an armature coil in a magnetic field (B) of an electric motor, electromagnetic force with the size and direction that are proportional to the vector product (I×B) between the current and the magnetic field is generated. Here, when the magnetic field is changed in time, induced current is applied to the armature coil based on Faraday's law of electromagnetic induction, and electromagnetic force with the size and direction that are proportional to the vector product (i×B) between the induced current (i) and the magnetic field (B) is generated by the interaction between induced current (i) and the magnetic field (B). The armature coil outputs motive power from the coaxial shaft while rotating by means of the electromagnetic force. However, in order to cause the armature coil to rotate in a fixed direction, the direction of the electromagnetic force has to be always constant. In other words, the direction of the vector obtained as a result of the vector product (i×B) between the induced current (i), which is applied to the armature coil, and the magnetic field (B) has to be constant at all times. In the case of a normal direct current motor, the direction of the magnetic field system is made constant by permanent magnet or electromagnet, and further the direction of armature current is made constant by a commutator, thus the electromagnetic force is always maintained in a fixed direction, and the armature is rotary driven in a fixed direction. Therefore, when applying induced current to the armature coil by changing the magnetic field in time, the induced current also is changed in time, thus there arises a problem that the direction of the induced current has to be appropriately controlled with respect to this changed magnetic field in order to make the direction of the electromagnetic force constant. On the other hand, in order to change the magnetic field in time, excitation current has to be supplied to the coil, but the problem is that the coil has to be excited by the lowest possible electrical power.

SUMMARY OF THE INVENTION

The present invention is contrived in view of such circumstances, and an object thereof is to provide an electromagnetic rotating machine of lightweight and high-energy efficiency, which produces big torque for rotating a large-diameter fan.

In order to achieve the abovementioned object, the first invention is an electromagnetic rotating machine, which comprises a rotating body and a fixed body, and drives the rotating body by using electromagnetic force which is produced by a mutual induction effect between an armature coil and an excitation coil, wherein the armature coil is disposed on an outer circumference of the rotating body, and the excitation coil is disposed on an inner peripheral surface of the fixed body which the armature coil faces.

In the electromagnetic rotating machine of the first invention, the armature coil is disposed on the outer circumference of the rotating body which is rotated, and the excitation coil is disposed on the inner peripheral surface of the fixed body which is fixed. Accordingly, parts such as an iron core, an auxiliary magnet, a housing and the like are unnecessary, thus the entire weight of the electromagnetic rotating machine can be made light, and big torque can be produced with small electromagnetic force.

In the second invention, the excitation coil is configured from n ($\geqq 2$) numbers of split excitation coils, and the armature coil is configured from one or more split armature coils, the split armature coil intersecting in the vicinity of the central portion thereof and being closed coils that form symmetry with respect to centerlines including the intersection of the armature coil, and the vicinity of a central portion of one of the split armature coils overlaps with the vicinity of a central portion of one of the split excitation coils so that the electromagnetic force is produced, and at that time the split armature coil overlaps with other split excitation coils at both sides of the split armature coil.

In the electromagnetic rotating machine of the second invention, when the vicinity of the central portion of the split armature coil overlaps with the vicinity of a central portion of any of the split excitation coils, the split armature coil overlaps with other split excitation coils at both sides of the split armature coil. In this case, the split armature coil overlaps with two or three different split excitation coils at the vicinity of the central portion and one side or both sides of the split armature coil, thus the split armature coil receives an electromagnetic induction effect individually from these split excitation coils. When the split excitation coil that overlaps with the vicinity of the central portion of the split armature coil is excited, this split excitation coil can provide a magnetic field to the split armature coil to apply induced current; however, since the split armature coil intersects in the vicinity of the central portion, the induced currents flow in directions opposite to one another in the vicinity of the central portion of the split armature coil. As a result, the induced currents cancel out one another and do not act as effective electromagnetic force. On the other hand, when the split excitation coil which overlaps with either side of the split armature coil is excited, induced current is applied to this split armature coil in the same manner, but since the split armature coil intersects in the vicinity of the central portion, the induced currents flow in parallel with one another and do not cancel out one another. Similarly, when the split excitation coils which overlap on the both sides of the split armature coil are excited by each other at a phase difference of, for example, 180°, the sizes of induced currents applied to each of the split excitation coils at the both sides of the split armature coil are the same, and the induced currents respectively have the 180° phase difference. However, since the split armature coil intersects in the vicinity of the central portion, the induced currents flow in parallel with one another in the vicinity of the central portion of the split armature coil. As a result, in the vicinity of the central portion of the split armature coil, effective electromagnetic force is produced by the mutual interaction between the induced currents and the magnetic field which penetrates through the vicinity of the central portion of the split armature coil.

In the third invention, when the vicinity of the central portion of one of the split armature coils overlaps with the vicinity of the central portion of one of the split excitation coils, the vicinity of a central portion of the other split armature coil overlaps with the vicinity of a central portion of the other split excitation coil.

In the electromagnetic rotating machine of the third invention, when the vicinity of the central portion of one of the split armature coils overlaps with the vicinity of the central portion of one of the excitation coils, the vicinities of the central portions of other split armature coils overlap with the vicinities of the central portions of any of the split excitation coils, thus electromagnetic forces are produced in the same manner in the vicinities of the central portions of other split armature coils as well, and the electromagnetic force is augmented preferably.

In the fourth invention, the electromagnetic rotating machine comprises means for performing excitation control such that, when the vicinity of the central portion of the split armature coil overlaps with the vicinity of the central portion of the split excitation coil, the split excitation coil forms, in the split armature coil, an effective magnetic field related to effective electromagnetic force for rotating the rotating body, and, when one of end portions of the split armature coil overlaps with the split excitation coil, the split excitation coil applies the split armature coil with effective induced current related to the effective electromagnetic force.

In the electromagnetic rotating machine of the fourth invention, the split excitation coil supplies an effective magnetic field related to effective electromagnetic force to the split armature coil, or effective induced current related to the effective electromagnetic force to the split armature coil depending on a relative position with respect to the split armature coil, thus effective electromagnetic force for rotating the rotating body is preferably produced by the mutual interaction between the effective magnetic field and the effective induced current.

In the fifth invention, the electromagnetic rotating machine comprises means for performing excitation control such that the split excitation coil is energized with current when overlapping with either one of the end portions of the split armature coil, and an adjacent split excitation coil that overlaps with the other end portion of the split armature coil is energized with current in a direction opposite to that of the split excitation coil.

In the electromagnetic rotating machine of the fifth invention, the adjacent excitation coils which overlap with the both sides of the split armature coil are energized with current in directions opposing each other, whereby magnetic fields opposing each other are formed on both sides of the split armature coil, and induced currents applied when the magnetic fields are changed in time are directed in opposite directions with each other, but since the split armature coil intersects in the vicinity of the central portion, the induced currents are directed in the same direction in the vicinity of the central portion of the split armature coil, and consequently become effective induced currents preferably for generation of effective electromagnetic force.

In the sixth invention, the electromagnetic rotating machine comprises means for performing excitation control on the split excitation coil such that a direction of force, which is generated as a result of the vector product between a vector of an effective magnetic field related to the effective electromagnetic force and formed in the split armature coil by one of the split excitation coils and a vector of effective induced current related to the effective electromagnetic force and applied to the split armature coil by the adjacent split excitation coils, corresponds with a direction of rotation of the rotating body.

Generally, when current flows into a conductor in a magnetic field, electromagnetic force which is proportional to the vector product between a vector of the current and a vector of the magnetic field is produced.

Therefore, in the electromagnetic rotating machine of the sixth invention, the direction of effective electromagnetic force corresponds to the direction in which a right screw moves when being rotated from the direction of the effective induced current to the direction of the effective magnetic field, the effective electromagnetic force being generated by the interaction between the effective magnetic field formed in the armature coil by the split excitation coil overlapping with the vicinity of the central portion of the split armature coil, and the effective induced current which is applied to the split armature coil by two split excitation coils overlapping at the both sides of the split armature coil. Therefore, controlling the directions of energization of the two split excitation coils that overlap at the both sides of the split armature coil, and the direction of energization of the split excitation coil that overlaps in the vicinity of the central portion of the split armature coil such that the force, which is generated as a result of the vector product between the vector of the effective induced current and the vector of the magnetic field, corresponds to the direction of rotation of the rotating body, allows the rotating body to be preferably rotated in a fixed direction.

In the seventh invention, the electromagnetic rotating machine comprises means for performing excitation control on the electromagnetic phase difference between the effective magnetic field formed in the split armature coil by one of the split excitation coils and the effective induced current applied to the split armature coil by other split excitation coils, such that an integration value between the effective magnetic field and the effective induced current is maximum.

In the electromagnetic rotating machine of the seventh invention, the product between the effective magnetic field which is formed in the split armature coil by the split excitation coil overlapping with the vicinity of the central portion of the split armature coil and the effective induced current which is applied to the split armature coil by the split excitation coils overlapping at the both sides of the split armature coil is proportional to the effective electromagnetic force, and the effective electromagnetic force is maximum when the integration value between the effective magnetic field and the effective induced current is maximum, thus the electromagnetic phase difference between the split excitation coils is set so that the integration value becomes maximum, whereby the efficiency of the energy of the rotating body is improved.

In the eighth invention, the split excitation coil comprises current supply means for supplying alternating current, switching means for conducting the alternating current in two directions, accumulating means for collecting the alternating current, and a charger for complementing the alternating current, and constitutes a closed circuit.

In the electromagnetic rotating machine of the eighth invention, the split excitation coil is preferably excited by the current supply means for supplying alternating current to the split excitation coil, and forms a magnetic field in the split armature coil. However, the current which is applied to the split excitation coil is changed in time, thus the formed magnetic field also is changed in time, and the time change of the magnetic field preferably applies induced current to the split armature coil. Further, the alternating current can be applied to the split excitation coil in two direction by the switching means, as a result of which the direction of the induced current applied to the split armature coil or the direction of the magnetic field formed in the split armature coil can be changed preferably. Furthermore, the alternating current which is applied to the split excitation coil is collected by the accumulating means, and loss portions of the alternating current are complemented in the charger. As a result, electrical power for exciting the split excitation coils is hardly consumed. Therefore, the effective electromagnetic force for rotating the rotating body in a fixed direction can be preferably generated without supplying electrical power from outside to the armature coil, and without consuming much of electrical power to excite the excitation coil, or with small amount of electrical power.

In the ninth invention, the closed circuit constitutes an LC circuit, and a time constant of the LC circuit is set sufficiently small with respect to a rotation period of the rotating body.

In the electromagnetic rotating machine of the ninth invention, since a time constant of the LC circuit is set sufficiently small with respect to a rotation period of the rotating body, the rotational speed of the split armature coil can be ignored, and a mutual induction effect between the split excitation coil and the split armature coil at the time when the split excitation coil is applied with current is considered quasi-static.

In the tenth invention, the charger is a small motor generator, small gas turbine generator, fuel cell, superconducting generator, or a combination thereof.

In the electromagnetic rotating machine of the tenth invention, since the alternating current which is applied to the split excitation coil is applied in two directions while being collected by the accumulating means, electrical power is hardly consumed in the closed circuit. Therefore, the charger can be constituted by a small motor generator, small gas turbine generator, fuel cell, superconducting generator, or a combination thereof.

In the eleventh invention, the split excitation coil and the split armature coil are made from a conductive material of which electrical resistance is reduced to the minimum at a predetermined temperature or less, or which has a low electrical resistance.

In the electromagnetic rotating machine of the eleventh invention, since the split excitation coil or the split armature coil is made from the conductive material, electrical resistance loss can be reduced to the minimum when the split excitation coil or the split armature coil is excited, as a result of which the capacity of the charger can be reduced, which can contribute to reduction of the entire weight of the electromagnetic rotating machine.

According to the electromagnetic rotating machine of the present invention, the excitation coil is disposed on the inner peripheral surface of the fixed body, and the armature coil is disposed on an outer circumference of the rotating body so as to face the excitation coil, thus heavy parts such as an iron core and the like are unnecessary, whereby the weight of the entire machine can be reduced to be lightweight, and also big torque can be produced with small electromagnetic force. Moreover, the excitation coil is configured with a plurality of split excitation coils, and the armature coil is configured with a plurality of split armature coils, wherein, when the vicinity of the central portion of one of the split armature coils overlaps with the vicinity of the central portion of one of the split excitation coils, each of the split excitation coils is disposed on the inner peripheral surface of the fixed body and each of the split armature coils is disposed on the outer circumference of the rotating body, such that the vicinity of the central portion of other split armature coil overlaps with the vicinity of the central portion of other split excitation coil respectively, and other split excitation coils respectively overlap with the split armature coil at both sides thereof. The direction of excitation is preferably controlled such that the split excitation coils act on the split armature coils respectively differently on the basis of a relative position with respect to the split armature coils. Specifically, excitation is preferably controlled such that, when the split excitation coil overlaps with the vicinity of the central portion of the split armature coil, an effective magnetic field related to effective electromagnetic force for rotating the rotating body in a fixed direction is formed in each of the split armature coils, and, when the split excitation coils overlap with one of end portions of the split armature coils respectively, effective induced current related to the effective electromagnetic force is applied to the split armature coils. Moreover, excitation of each of the split excitation coils is preferably controlled so that the vector product between the direction of the effective inducted current and the direction of the effective magnetic field correspond to the direction of rotation of the rotating body. As a result, the effective electromagnetic force can be preferably generated without supplying current from outside to the split armature coils, and the rotating body can be rotated in a fixed direction. Moreover, the alternating current which has excited the split excitation coils is collected in a forward direction or backward direction by the accumulating means, and is again caused to flow in the forward direction or backward direction by the switching means, and loss of alternating current is complemented in the charger. Since an iron core does not exist, magnetic loss such as hysteresis loss and eddy-current loss can be reduced. As a result, the magnetic energy of the split excitation coils is collected as an electrical energy by the accumulating means, and reused by the switching means. Therefore, the electromagnetic rotating machine of the present invention has an energy collection function. Accordingly, the effective electromagnetic force for rotating the rotating body in a fixed direction can be preferably generated without consuming much of the electric power for exciting the excitation coil or with small electrical power consumption. As a result, the efficiency of the energy of the rotating body is improved significantly.

DESCRIPTION OF THE PREFERRED EMBODIMENTS

The present invention is described hereinafter in detail on the basis of the embodiments shown in the figures.

Embodiment 1

Figure 1:
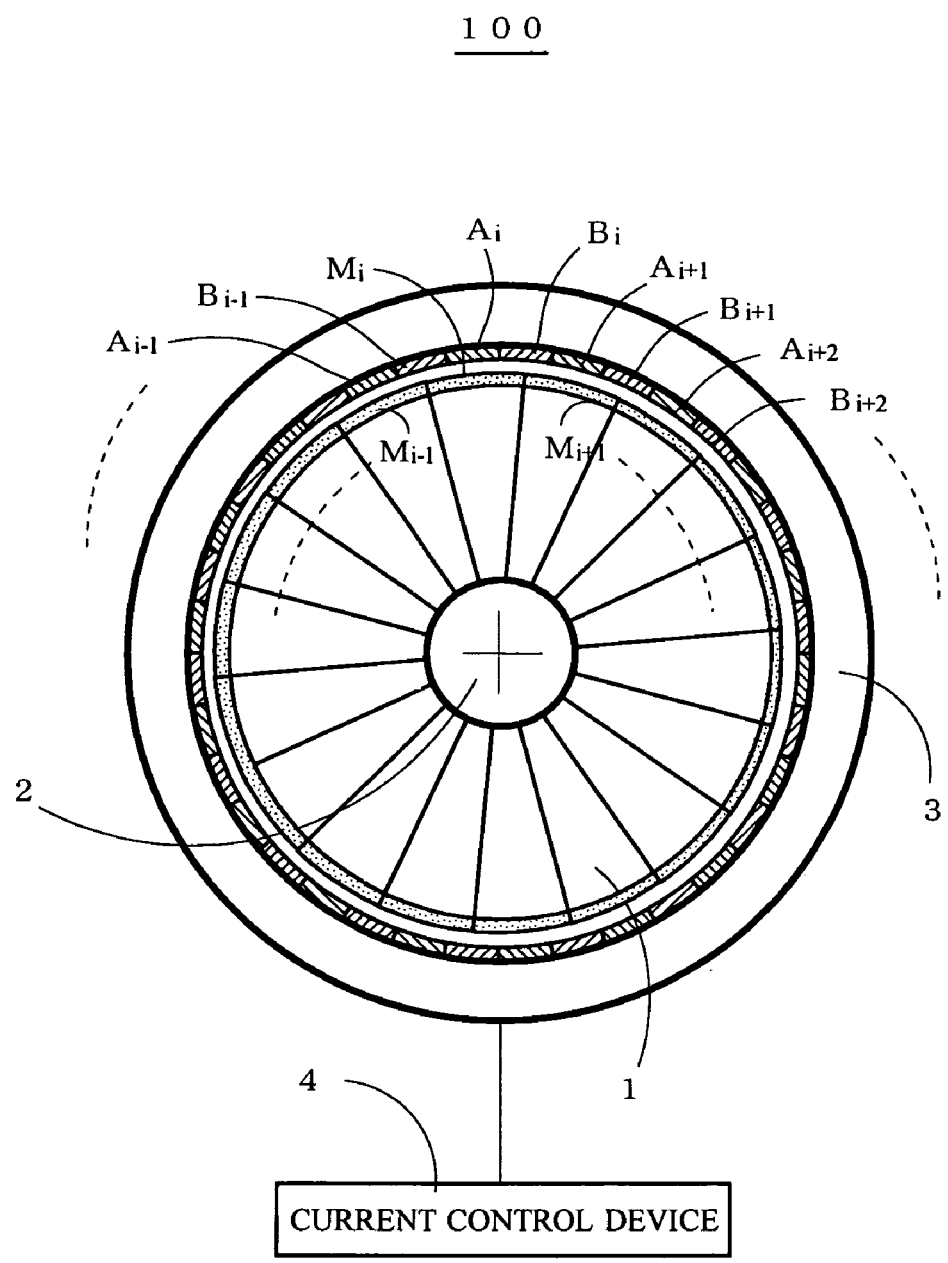
FIG. 1 is a front view showing a substantial part of an electromagnetic driving fan of an embodiment of the present invention.

FIG. 1 is a front view showing a substantial part of an electromagnetic driving fan 100 of an embodiment of the present invention.

The electromagnetic driving fan 100 comprises a fan blade 1 as a rotating body which increases the flow speed of air which has been taken in and injects the air backward so that thrust in a opposite direction of the injection is produced in response to the injection, a shaft 2 to which the fan blade 1 is attached, a fan casing 3 as a fixed body which stores the fan blade 1 and the shaft 2, a coil $A_i$ row (i=1, 2, . . . , n) as a split excitation coil which is attached to an inner peripheral surface of the fan casing 3 so as to face an outer circumference of the fan blade 1, and generates an effective magnetic field related to effective electromagnetic force for rotating the fan blade 1, a coil $B_i$ row (i=1, 2, . . . , n) as a split excitation coil which applies effective induced current related to the effective electromagnetic force to a split armature coil which is described hereinbelow, a coil $M_i$ row (i=1, 2, . . . , n) as the split armature coil which is attached to the outer circumference of the fan blade 1 and generates the effective electromagnetic force through the interaction between the effective magnetic field and the effective induced current, a current control device 4 which controls current for the coil $A_i$ and the coil $B_i$, and a position detection sensor (not shown) which detects an angle or displacement of the coil $M_i$. It should be noted that the split excitation coils change the roles thereof in accordance with a relative position with respect to the coil $M_i$. Specifically, when the split excitation coil overlaps with a central portion of the coil $M_i$, the split excitation coils supply an effective magnetic field related to the abovementioned effective electromagnetic force to the coil $M_i$, and, when the split excitation coil overlaps with either one of end portions of the coil $M_i$, the split excitation coils apply effective induced current related to the effective electromagnetic force to the coil $M_i$. Therefore, for convenience of explanation, distinction is made such that the coil $A_i$ is for the case in which an effective magnetic field related to the effective electromagnetic force is formed in the coil $M_i$, and the coil $B_i$ is for the case in which effective induced current related to the effective electromagnetic force is applied to the coil $M_i$; however, the coil $A_i$ and the coil $B_i$ are exactly the same coils in terms of the structure, thus the split excitation coils may be the coil $A_i$ and the coil $B_i$.

Figure 2:
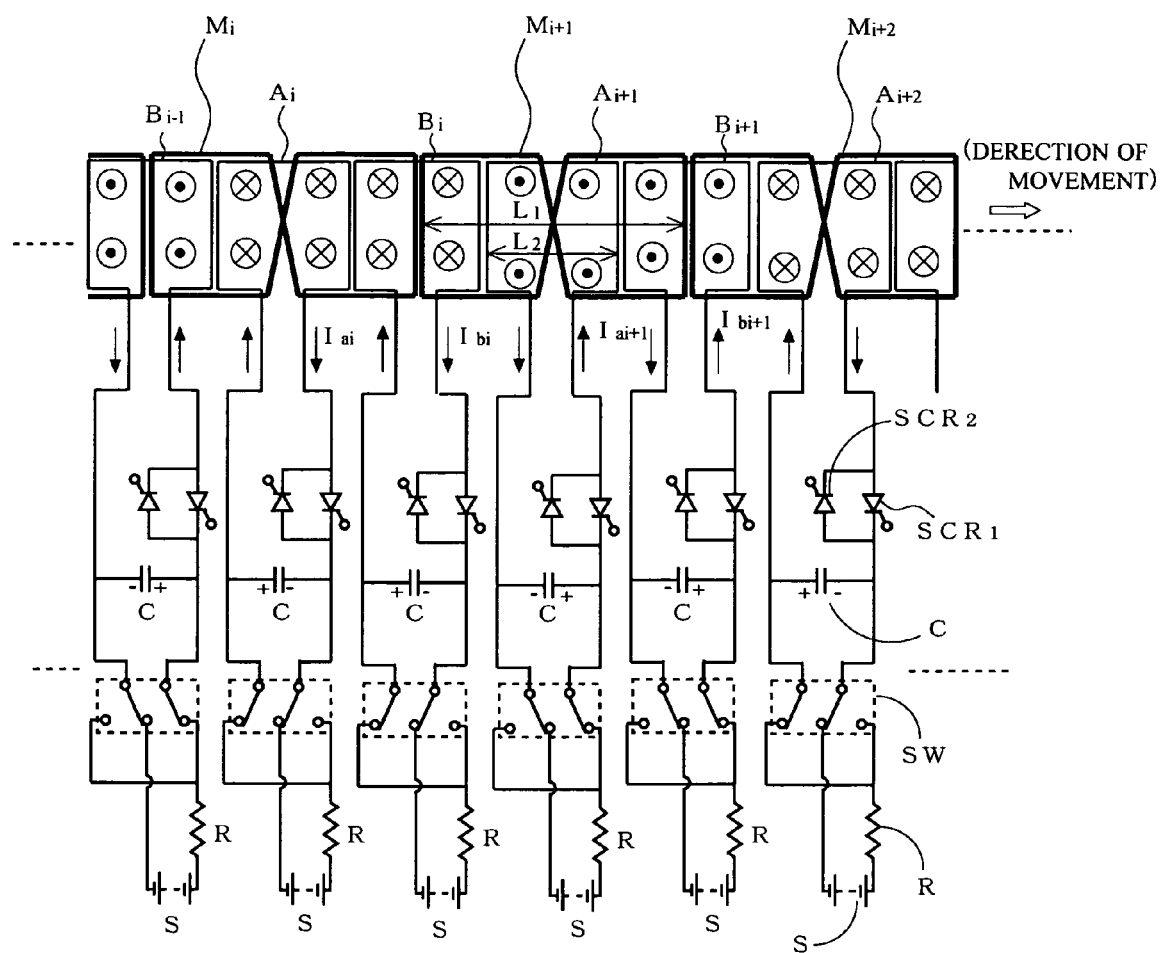
FIG. 2 is an explanatory diagram showing a two-dimensional relative position of a coil $A_i$ row or coil $B_i$ row with respect to a coil $M_i$ row.

In the present embodiment, as shown in FIG. 2, the width length of the coil $M_i$ is set as $L_1$, and the width length of the coil $A_i$ or the coil $B_i$ is set as $L_2$, which is abbreviated as $L_1/2$.

It should be noted that the abovementioned effective magnetic field is one of magnetic fields formed in the split armature coils by the split excitation coils, and is a cause of generation of the effective electromagnetic force. The abovementioned effective induced current is one of induced currents applied to the split armature coils by the split excitation coils, and is a cause of generation of the effective electromagnetic force.

Further, the current control device 4 relates to control of current for the coil $A_i$ row and the coil $B_i$ row, and performs control of current on, for example, a combination of a plurality of continuous coils A and coils B, or, for example, a group of a coil $A_i$, coil $B_i$, coil $A_{i+1}$, and coil $B_{i+1}$.

Moreover, the coil $M_i$ row may be embedded inside of the outer circumference of the fan blade 1, and the coil $A_i$ row and the coil $B_i$ row may be embedded inside the inner peripheral surface of the fan casing 3. Alternatively, the coil $M_i$ row may be disposed on a part of the outer circumference of the fan blade 1, and the coil $A_i$ row and the coil $B_i$ row may be disposed on a part of the inner peripheral surface of the fan casing 3.

According to the electromagnetic driving fan 100, a configuration is employed in which the coil $M_i$ row (i=1, 2, . . . , n) as the armature coil is disposed on the outer circumference of the fan blade 1, and an iron core and the like are not required, thus the entire weight of the electromagnetic driving fan can be made lightweight. Furthermore, since the coil $M_i$ row (i=1, 2, . . . , n) is disposed on the outer circumference of the fan blade 1, which is far from the center of rotation, big torque can be produced with relatively small effective electromagnetic force, and the fan blade 1 can be rotated preferably.

FIG. 2 is an explanatory diagram showing a two-dimensional relative position of the coil $A_i$ row or coil $B_i$ row with respect to the coil $M_i$ row.

This figure shows a state in which the coil $M_i$ row is projected onto the inner peripheral surface of the fan casing 3, and the inner peripheral surface of the fan casing 3 is unrolled to show as a two-dimensional flat surface. It should be noted that the coil $A_i$ row or the coil $B_i$ row is disposed on the inner peripheral surface of the fan casing 3, thus they rest with respect to the coil $M_i$ row. On the other hand, the coil $M_i$ row is disposed on the outer circumference of the fan blade 1, thus it moves with respect to the coil $A_i$ row or the coil $B_i$ row.

The coil $A_i$ or coil $B_i$ is a, for example, single-wound or compound-wound split excitation coil in the form of a rectangle, and comprises, at an end portion thereof, a condenser C which constitutes an LC circuit together with the coil $A_i$ or coil $B_i$, a first and a second silicon controlled rectifier $SCR_1$ and $SCR_2$ which conduct current to the coil $A_i$ or coil $B_i$ in two directions, a switching circuit SW which switches the bias direction of the condenser C in accordance with the polarity of the condenser C, and a power source S which supplies an electrical charge to the condenser C. It should be noted that switching control of the first and second silicon controlled rectifier $SCR_1$ and $SCR_2$ and the switching control of the switching circuit SW are performed by the current control device 4 on the basis of information from the position detection sensor which shows a position of rotation of the coil $M_i$.

Further, actuation of the electromagnetic driving fan 100 related to the present invention is described in detail with reference to FIGS. 3 through 7. However, the coil $A_i$ and the coil $B_i$ have in common in terms of contribution to generation of effective electromagnetic force for rotating the fan blade 1 with respect to the coil $M_i$. However, the roles of the coil $A_i$ and the coil $B_i$ are completely different in terms of the mechanism that the coil $M_i$ generates the effective electromagnetic force. Specifically, the coil $A_i$ plays a role of providing the coil $M_i$ with an effective magnetic field related to effective electromagnetic force, and, on the other hand, the coil $B_i$ plays a role of applying the coil $M_i$ with effective induced current related to the effective electromagnetic force. Reactive induced current which is applied to the coil $M_i$ by the coil $A_i$ and does not contribute to rotation of the fan blade 1 is canceled out preferably due to the structure of the coil $M_i$, and reactive electromagnetic force, which is produced by reactive magnetic field which is provided to the coil $M_i$ by the coil $B_i$ and does not contribute to the rotation of the fan blade 1, is also canceled out.

Moreover, since the coil $A_i$ or the coil $B_i$ configure the LC circuit along with the condenser C and, current that flows into the coil $A_i$ or the coil $B_i$ when the silicon controlled rectifiers are switched on is current which changes in time, or so-called alternating current. Accordingly, when alternating current flows in the coil $A_i$ or coil $B_i$ as excitation current, a magnetic field which is formed by the excitation current and penetrates through the coil $M_i$ also changes in time. Therefore, the time change of the magnetic field causes induced current to flow in the coil $M_i$ in a direction of preventing the magnetic field from being changed in time. Accordingly, current can be allowed to flow in the coil $M_i$, which is an armature coil, without supplying current from outside.

Furthermore, when current flowing in the coil $A_{i+1}$ is taken as $I_{ai+1}$, and current flowing in the coil $B_{i+1}$ is taken as $I_{bi+1}$, the sizes of adjacent coils A or coils B become equal, and the directions of the adjacent coils become opposite with each other. Specifically, $|I_{ai}|=|I_{ai+1}|$ and $I_{ai}=-I_{ai+1}$, or $|I_{bi}|=|I_{bi+1}|$ and $I_{bi}=-I_{bi+1}$ are obtained.

Generally, when the width length of the coil $A_i$ or coil $B_i$ is taken as $L_2$, and the width length of the coil $M_i$ is taken as $L_1$, the relationship of $L_1/2 \leq L_2 < L_1$ is established between $L_1$ and $L_2$. Therefore, a magnetic field which is generated by applying current to the coil $A_i$ or coil $B_i$ can act on the coil $M_i$ efficiently. It should be noted that the present embodiment explains the case in which $L_2=L_1/2$ is obtained.

The coil $M_i$ is a figure-of-eight coil which crosses and forms symmetry at a central portion, and, for convenience of explanation, may be a single-wound or compound-wound coil. The detail description of the coil $M_i$ is provided with reference to FIGS. 3 through 7. Because the coil $M_i$ crosses, for example, the induced current applied to the coil $M_i$ by the coil $A_i$ is canceled out with each other at the central portion, as a result of which the coil $A_i$ provides the coil $M_i$ with only an effective magnetic field related to the effective electromagnetic force which contributes to rotation of the fan blade 1. On the other hand, the induced currents applied to the coil $M_i$ by, for example, the coil $B_i$ and coil $B_{i+1}$ respectively flow in the same direction, and electromagnetic force generated by the induced currents is added. However, the directions of magnetic fields formed in the coil $M_{i+1}$ by the coil $B_i$ and coil $B_{i+1}$ at both end portions of the coil $M_i$ are different, and the induced current flow in the same direction, thus electromagnetic force generated by the interaction between the magnetic fields and the induced currents cancel out with each other, as a result of which the coil $B_i$ and the coil $B_{i+1}$ apply the coil $M_i$ with only effective induced current related to the effective electromagnetic force.

It should be noted that the present embodiment is, as the best mode, configured such that effective induced current related to effective electromagnetic force is applied to the coil $M_i$ by exciting the coils overlapping at both sides of the coil $M_i$, that is, for example, two split excitation coils, the coil $B_i$ and the coil $B_{i+1}$, but also possible is a configuration in which effective induced current related to effective electromagnetic force is applied to the coil $M_i$ by exciting either the coil $B_i$ or coil $B_{i+1}$, in other words, by exciting one split excitation coil.

It should be noted that the silicon controlled rectifiers are employed as the switching means in the present embodiment, but semiconductor switching elements such as a power transistor, power MOSFET, IGBT, or the like may be used.

Moreover, the power source S is, for example, a small motor generator, small gas turbine generator, fuel cell, or accumulator.

The coil $A_i$, coil $B_i$, and coil $M_i$ are made from a conductive material of which electrical resistance is reduced to the minimum at a predetermined temperature or less, or which has a low electrical resistance, and are, for example, a superconducting coil.

Here, the mechanism for generating the effective electromagnetic force contributing to rotation of the fan blade 1 is described with reference to FIGS. 3 through 7. For simple explanation, an electromagnetic induction effect between the coil $A_{i+1}$ and the coil $M_{i+1}$, and an electromagnetic induction effect of the coil $B_i$ and coil $B_{i+1}$ with respect to the coil $M_{i+1}$ are described separately.

Figure 3:
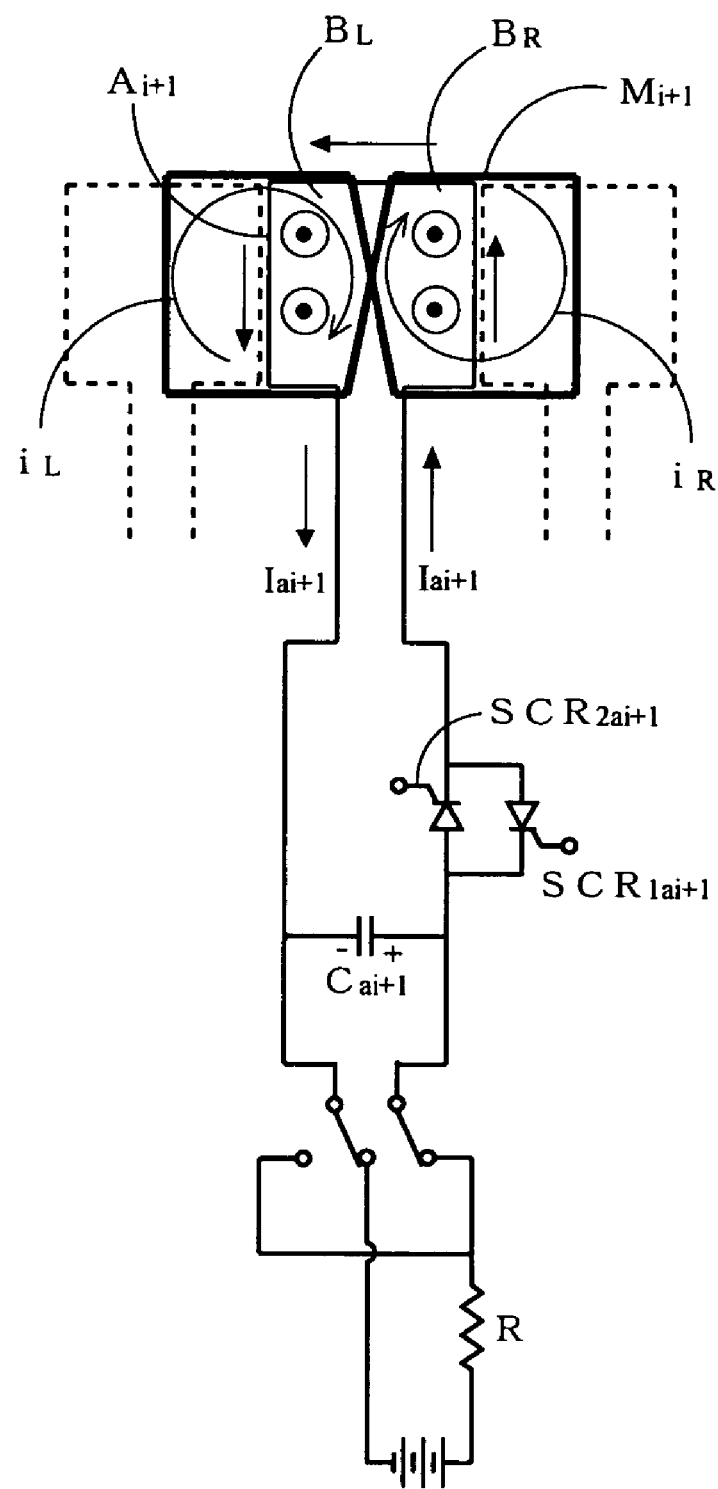
FIG. 3 is an explanatory diagram showing an electromagnetic induction effect between a coil $A_{i+1}$ and a coil $M_{i+1}$.

FIG. 3 is an explanatory diagram showing an electromagnetic induction effect between the coil $A_{i+1}$ and the coil $M_{i+1}$. It should be noted that a condenser $C_{ai+1}$ is charged in a polarity which is shown in the figure.

As shown in FIG. 7(a) in which the horizontal axis indicates time, when t=0 where a central portion of the split excitation coil corresponds to a central portion of the split armature coil $M_{i+1}$, the current control device 4 switches a second silicon controlled rectifier $SCR_{2ai+1}$ on, whereby the excitation current $I_{ai+1}$ flows in the coil $A_{i+1}$ in a direction shown in FIG. 7(b), and the magnetic field $B_{ai+1}$ is formed from the back to the front of the page space in FIG. 3 (FIG. 7(c)). Since the coil $A_{i+1}$ configures the LC circuit along with the condenser $C_{ai+1}$, a potential difference $V_{ai+1}$ and the excitation current $I_{ai+1}$ of the coil $A_{i+1}$ oscillate in a fixed period T ($=2\pi \times (LC)^{1/2}$), whereby a half sine wave in which the phases differ by $\pi/2$ is formed. Then, the potential difference $V_{ai+1}$ of the coil $A_{i+1}$ becomes zero when t=T/4, but electromotive force is produced by self induction of the coil $A_{i+1}$. For this reason, the excitation current $I_{ai+1}$ continues to flow while being reduced. When t=T/2, an electrical charge opposite to the initial electrical charge is accumulated in the condenser, and the current control device 4 switches the second silicon controlled rectifier $SCR_{2ai+1}$ off, whereby the condenser $C_{ai+1}$ is charged in an opposite direction. Returning to FIG. 3, when the magnetic field $B_{ai+1}$ is divided into a left magnetic field $B_L$ and a right magnetic field $B_R$, left induced electromotive force $E_L$ which is proportional to $dB_L/dt$ is induced to the coil $M_{i+1}$ by time change of the left magnetic field $B_L$, and left induced current $i_L$ corresponding to the induced electromotive force $E_L$ flows in the coil $M_{i+1}$. On the other hand, right induced electromotive force $E_R$ which is proportional to $dB_R/dt$ is induced to the coil $M_{i+1}$ by time change of the right magnetic field $B_R$, and right induced current $i_R$ corresponding to the induced electromotive force $E_R$ flows in the coil $M_{i+1}$. It should be noted that operation of the excitation current $I_{ai+1}$ is extremely faster than rotational operation of the fan blade 1, thus the fan blade 1, i.e. the coil $M_{i+1}$, is considered to be resting while the excitation current $I_{ai+1}$ is flowing. As a result, the sizes of the left magnetic field $B_L$ and the right magnetic field $B_R$ become equal by the excitation current $I_{ai+1}$. Consequently, the sizes of the left induced electromotive force $E_L$ and the right induced electromotive force $E_R$ become equal, and the sizes of the left induced current $i_L$ and the right induced current $i_R$ become equal as well.

However, the directions of the left induced current $i_L$ and the right induced current $i_R$ become opposite to each other since the coil $M_{i+1}$ crosses at the central portion, thus the induced currents $i_L$ and $i_R$ cancel out with each other, and eventually induced electromotive force and induced current are not applied due to time change of the magnetic field $B_{ai+1}$, as a result of which the coil $A_{i+1}$ provides the coil $M_{i+1}$ with the magnetic field $B_{ai+1}$ only.

Figure 4:
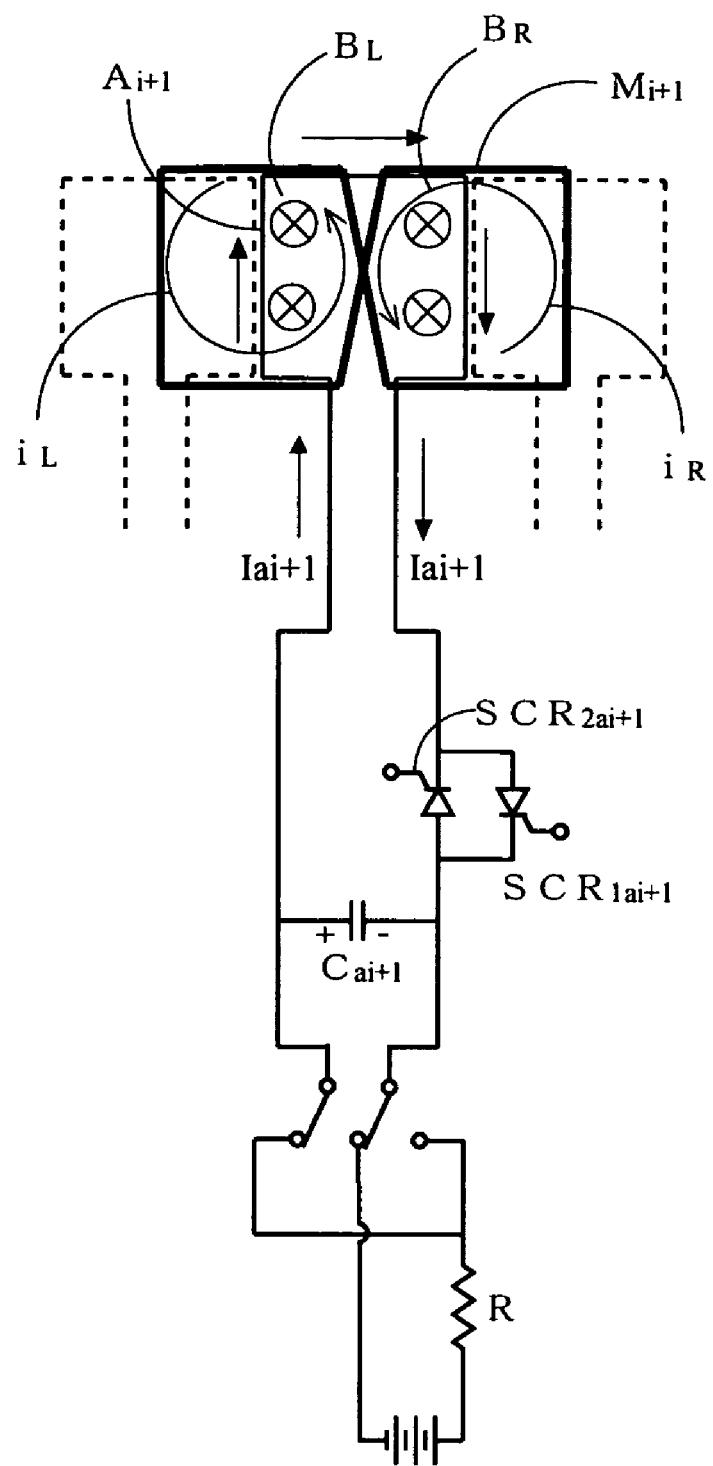
FIG. 4 is an explanatory diagram showing an electromagnetic induction effect between the coil $A_{i+1}$ and the coil $M_{i+1}$.

Returning to FIG. 7(a), after a lapse of a fixed time ($=T_0$), when the central portion of the split armature coil overlaps with the central portion of the split excitation coil again, the current control device 4 switches a first silicon controlled rectifier $SCR_{1ai+1}$ on, whereby the excitation current $I_{ai+1}$ flows in the opposite direction as shown in FIG. 7(b), and the magnetic field $B_{ai+1}$ is formed from the front to the back of the page space in FIG. 4 (FIG. 7(c)). Since the coil $A_{i+1}$ configures the LC circuit along with the condenser $C_{ai+1}$, the potential difference $V_{ai+1}$ and the excitation current $I_{ai+1}$ of the coil $A_{i+1}$ oscillate in the fixed period T ($=2\pi \times (LC)^{1/2}$), whereby a half sine wave in which the phases differ by $\pi/2$ is formed. Then, the potential difference $V_{ai+1}$ of the coil $A_{i+1}$ becomes zero when $t=T_0+T/4$, but electromotive force is produced by self induction of the coil $A_{i+1}$ in a direction of maintaining current. For this reason, the excitation current $I_{ai+1}$ continues to flow while being reduced. When $t=T_0+T/2$, an electrical charge opposite to the electrical charge of the case when $t=T_0$ is accumulated in the condenser, and the current control device 4 switches the first silicon controlled rectifier $SCR_{1ai+1}$ off, whereby the condenser $C_{ai+1}$ is charged in a forward direction. Returning to FIG. 4, as in the case in FIG. 3, the left induced current $i_L$ and the right induced current $i_R$ flow in the directions opposite to each other since the coil $M_{i+1}$ crosses at the central portion, and the induced currents $i_L$ and $i_R$ cancel out each other, and eventually induced electromotive force and induced current are not applied due to time change of the magnetic field $B_{ai+1}$, as a result of which the coil $A_{i+1}$ provides the coil $M_{i+1}$ with the magnetic field $B_{ai+1}$ only. Thereafter, these operations are repeated.

Moreover, the same operation is carried out for each of the coils $A_1, A_2, \ldots, A_{i-1}, A_{i+1}, \ldots, A_n$.

Figure 5:
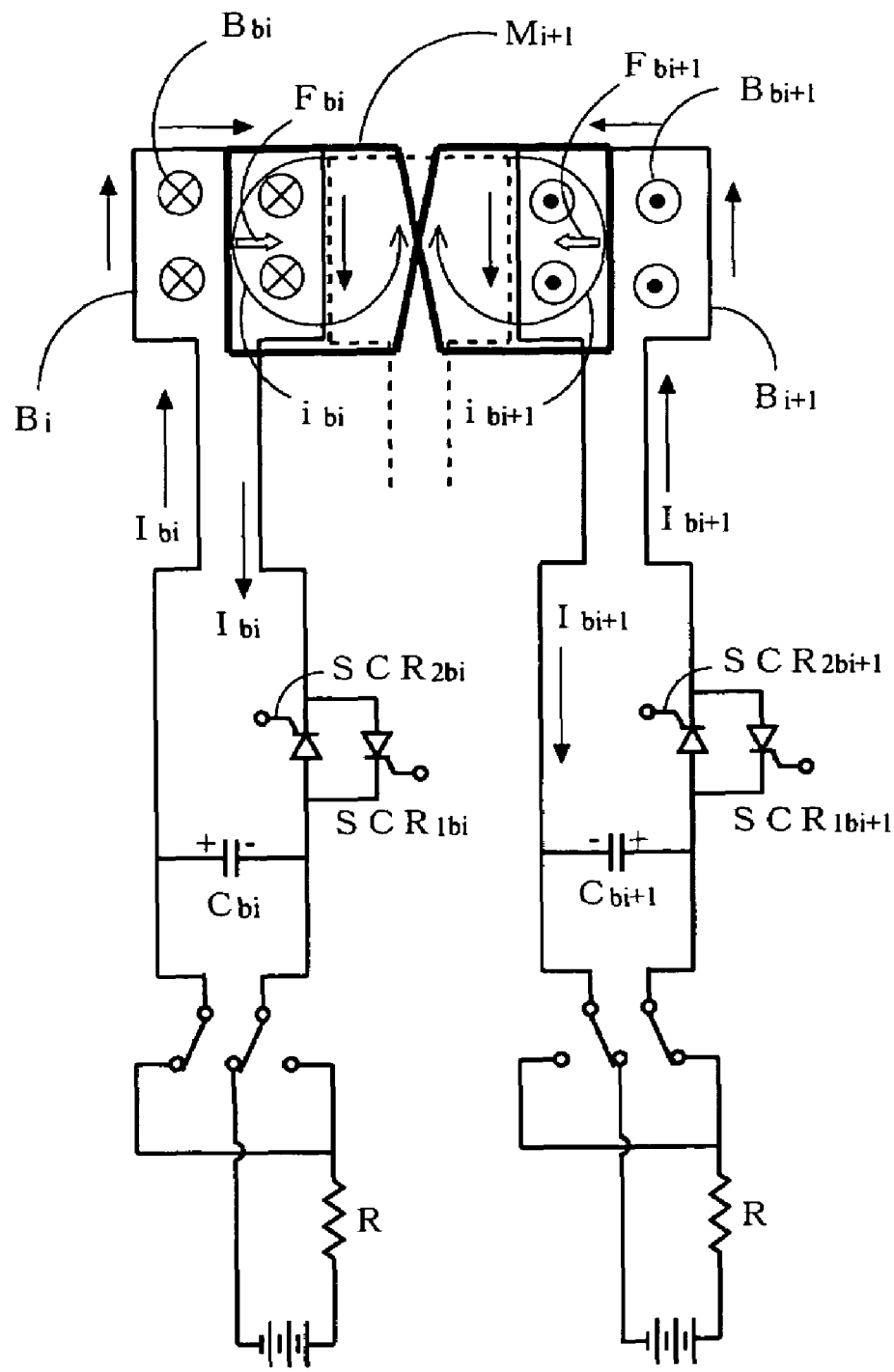
FIG. 5 is an explanatory diagram showing an electromagnetic induction effect of a coil $B_i$ and coil $B_{i+1}$ with respect to a coil $M_{i+1}$.

FIG. 5 is an explanatory diagram showing an electromagnetic induction effect of the coil $B_i$ and coil $B_{i+1}$ with respect to the coil $M_{i+1}$. It should be noted that each of the condensers $C_{bi}$ and $C_{bi+1}$ is charged in polarities shown in the figure.

Figure 7:
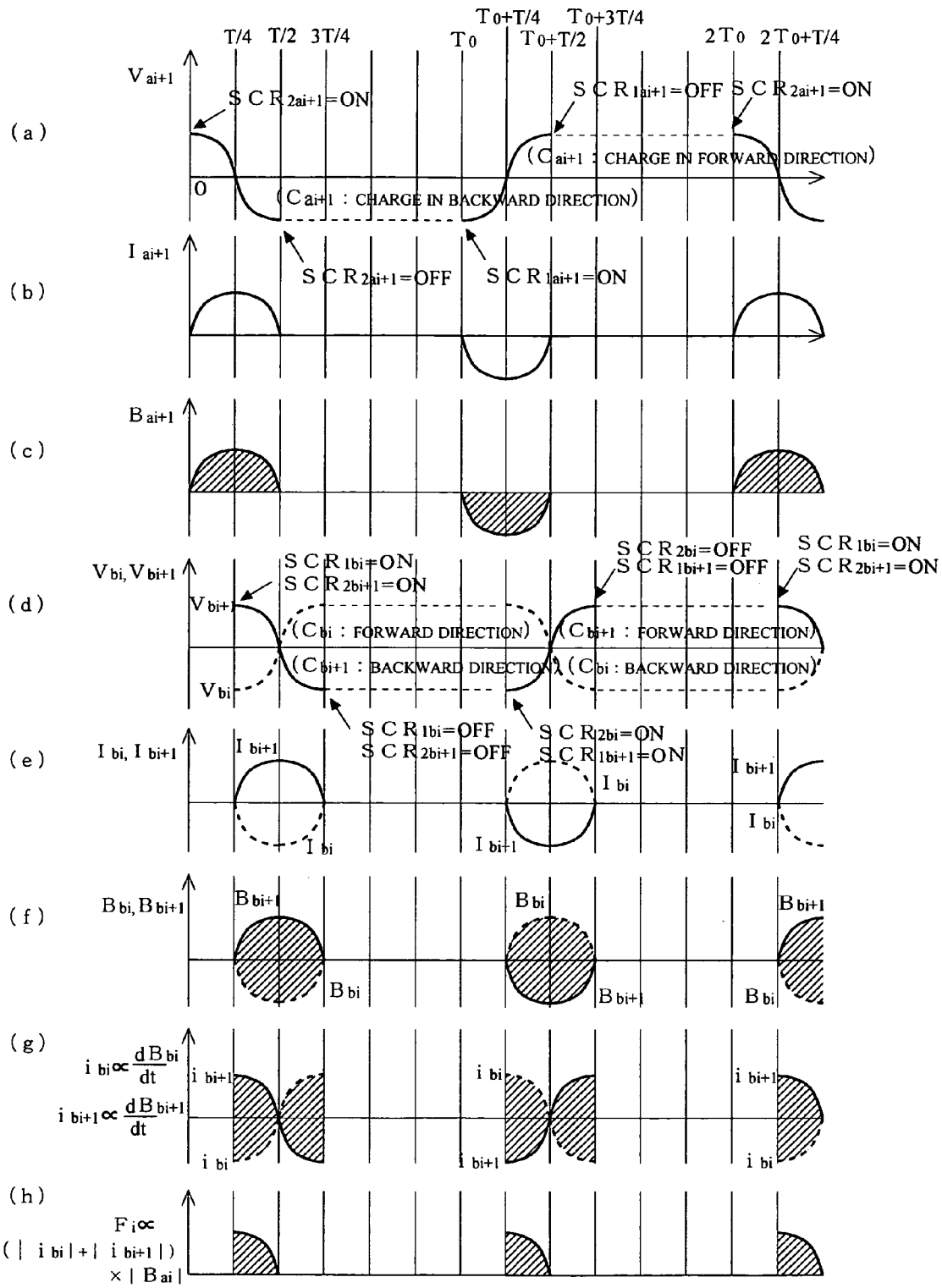
FIG. 7 is an explanatory diagram showing excitation of the coil $A_{i+1}$, coil $B_i$, and coil $B_{i+1}$.

The same operation as the case of the coil $A_{i+1}$ is performed on each of the coils in the coil $B_i$ row with the same structure, as described above, thus explanation is provided using FIG. 7. As shown in FIG. 7(d), when $t=T/4$ where the potential difference $V_{ai+1}$ of the coil $A_{i+1}$ is zero, i.e. the excitation current $I_{ai+1}$ of the coil $A_{i+1}$ is maximum, the current control device 4 switches a first silicon controlled rectifier $SCR_{1bi}$ and a second silicon controlled rectifier $SCR_{2bi+1}$ on, whereby excitation currents $I_{bi}$ and $I_{bi+1}$ shown in FIG. 7(e) flow in the coils $B_i$ and $B_{i+1}$, and a left magnetic field $B_{bi}$ is formed from the front to the back of the page space, and a right magnetic field $B_{bi+1}$ is formed from the back to the front of the page space respectively as shown in FIG. 5 (FIG. 7(f)). Since the coils $B_i$ and $B_{i+1}$ configure the LC circuit along with the condenser, potential differences of the respective coils and corresponding excitation currents oscillate in a fixed period T ($=2\pi \times (LC)^{1/2}$), whereby a half sine wave in which the phases differ by $\pi/2$ is formed. Then, the potential differences $V_{bi}$ and $V_{bi+1}$ of the respective coils become zero when $t=T/2$, but electromotive force is produced by self induction of each of the coils $B_i$ and $B_{i+1}$ in a direction of maintaining current. For this reason, the excitation currents $I_{bi}$ and $I_{bi+1}$ continue to flow while being reduced. When $t=3T/4$, an electrical charge opposite to the initial electrical charge is accumulated in each of condensers $C_{bi}$ and $C_{bi+1}$, and the current control device 4 switches the first silicon controlled rectifier $SCR_{1bi}$ and the second silicon controlled rectifier $SCR_{2bi+1}$ off, whereby the condenser $C_{bi}$ is charged in the forward direction, and the condenser $C_{bi+1}$ is charged in an opposite direction. Returning to FIG. 5, the excitation currents $I_{bi}$ and $I_{bi+1}$ flow as shown in the figure. It should be noted that the time constant of the LC circuit is determined such that the operation time of each of the excitation currents $I_{bi}$ and $I_{bi+1}$ is sufficiently smaller than the rotation time of the fan blade 1. Specifically, the fan blade 1, i.e. the coil $M_{i+1}$ is considered to be resting while the excitation currents $I_{bi}$ and $I_{bi+1}$ are flowing.

Left induced electromotive force $E_{bi}$ which is proportional to $dB_{bi}/dt$ is induced to the coil $M_{i+1}$ by time change of a left magnetic field $B_{bi}$, and left induced current $i_{bi}$ corresponding to the induced electromotive force $E_{bi}$ flows in the coil $M_{i+1}$. On the other hand, right induced electromotive force $E_{bi+1}$ which is proportional to $dB_{bi+}/dt$ is induced to the coil $M_{i+1}$ by time change of a right magnetic field $B_{bi+1}$, and right induced current $i_{bi+1}$ corresponding to the induced electromotive force $E_{bi+1}$ flows in the coil $M_{i+1}$. Incidentally, the sizes of the left magnetic field $B_{bi}$ and the right magnetic field $B_{bi+1}$ are the same, but the directions of those magnetic fields are opposite to each other, thus the left induced current $i_{bi}$ and the right induced current $i_{bi+1}$ are applied in directions opposite to each other (FIG. 7(g)).

However, since the coil $M_i$ crosses at the central portion, the left induced current $i_{bi}$ and the right induced current $i_{bi+1}$ are directed in the same direction at the central portion or both end portions of the coil $M_i$, thus each of the induced currents $i_{bi}$ and $i_{bi+1}$ is added in the central portion. Particularly, as shown in FIG. 7(c), when $T/4 \leq t \leq T/2$, the abovementioned magnetic field $B_{ai+1}$ formed by the coil $A_{i+1}$ penetrates through the central portion of the split armature coil $M_{i+1}$, thus effective electromagnetic force $F_i$ shown in FIG. 7(h) is produced by the interaction between the induced currents $i_{bi}, i_{bi+1}$ and the magnetic field $B_{ai+1}$.

Incidentally, in the both end portions of the split armature coil, electromagnetic force $F_{bi}$ and $F_{bi+1}$ are produced respectively by the interaction between the induced currents $i_{bi}, i_{bi+1}$ and the magnetic fields $B_{bi}, B_{bi+1}$. However, the directions of the currents are the same and the directions of the magnetic fields are opposite to each other, thus the electromagnetic force $F_{bi}$ and $F_{bi+1}$ cancel out each other, and do not act as effective electromagnetic force.

Figure 6:
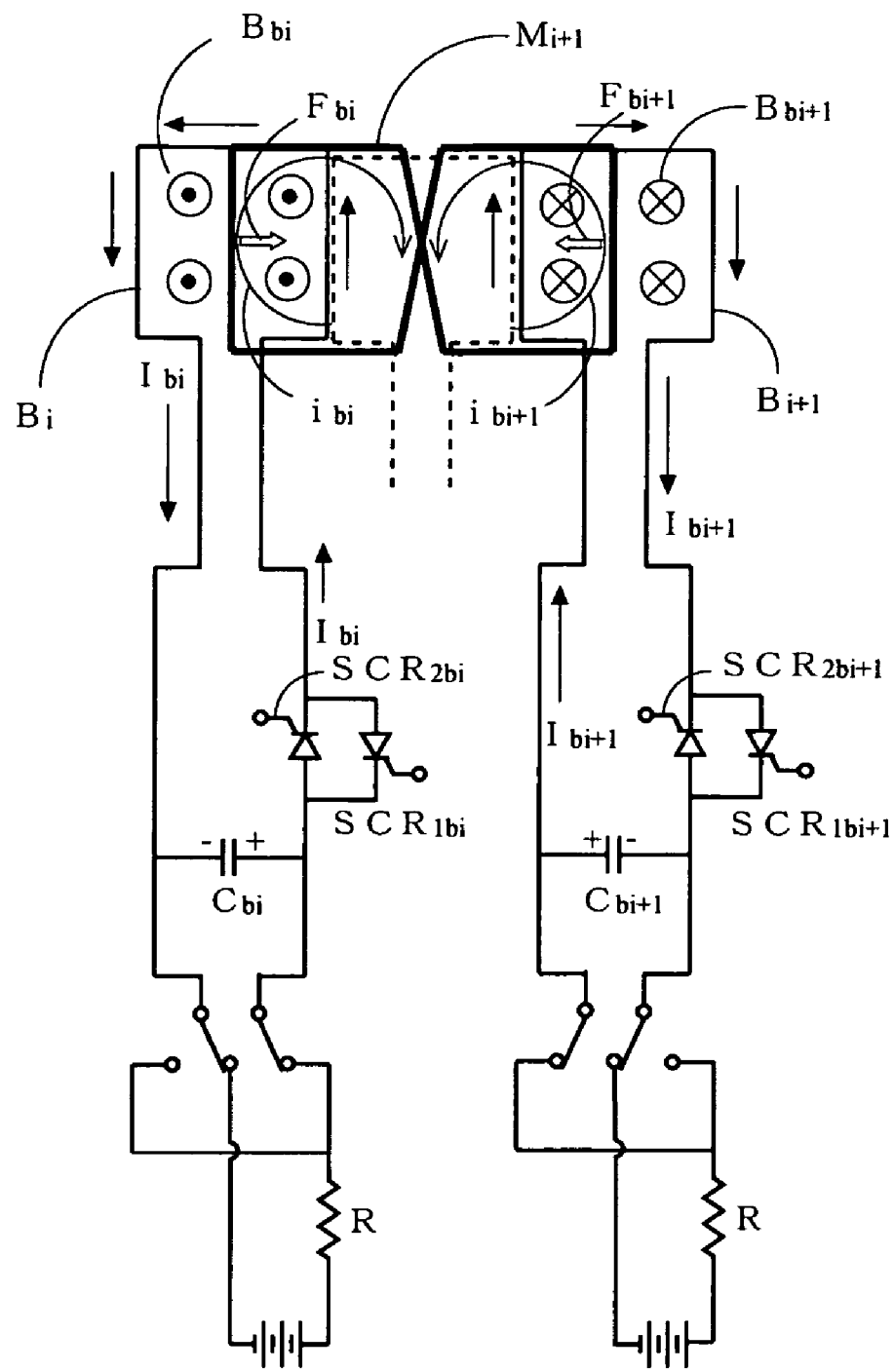
FIG. 6 is an explanatory diagram showing an electromagnetic induction effect of the coil $B_i$, coil $B_{i+1}$ with respect to the coil $M_{i+1}$.

Returning to FIG. 7(d), after a lapse of a fixed time ($=T_0+T/4$), the current control device 4 switches the second silicon controlled rectifier $SCR_{2bi}$ and the first silicon controlled rectifier $SCR_{1bi+1}$ on, whereby the excitation currents $I_{bi}, I_{bi+1}$ shown in FIG. 7(e) flow respectively into the coils $B_i, B_{i+1}$, and the left magnetic field $B_{bi}$ is formed from the back to the from of the page space, and the right magnetic field $B_{bi+1}$ is formed from the front to the back of the page space as shown in FIG. 6 (FIG. 7(f)). Since the coils $B_i$ and $B_{i+1}$ configure the LC circuit along with the condenser, potential differences of the respective coils $B_i$, $B_{i+1}$ and corresponding excitation currents oscillate in a fixed period T ($=2\pi\times(LC)^{1/2}$), whereby a half sine wave in which the phases differ by $\pi/2$ is formed. Then, the potential differences of the respective coils become zero when $t=T_0+T/2$, but electromotive force is produced respectively by self induction of the coils $B_i$ and $B_{i+1}$ in a direction of maintaining current. For this reason, the excitation currents $I_{bi}$ and $I_{bi+1}$ continue to flow while being reduced. When $t=T_0+3T/4$, an electrical charge opposite to the electrical charge of the case where $t=T_0+T/4$ is accumulated in each of condensers $C_{bi}$ and $C_{bi+1}$, and the current control device 4 switches the second silicon controlled rectifier $SCR_{2bi}$ and the first silicon controlled rectifier $SCR_{1bi+1}$ off. Returning to FIG. 6, as in the case in FIG. 5, the left induced current $i_{bi}$ and the right induced current $i_{bi+1}$ flow in the same direction in the central portion of the coil $M_{i+1}$ since the coil $M_{i+1}$ crosses at the central portion, and the induced currents $i_{bi}$, $i_{bi+1}$ add each other. Particularly, as shown in FIG. 7(c), when $T_0+T/4 \leq t \leq T_0+T/2$, the abovementioned magnetic field $B_{ai+1}$ formed by the coil $A_{i+1}$ penetrates through the central portion of the split armature coil $M_{i+1}$, thus the effective electromagnetic force $F_i$ shown in FIG. 7(h) is produced by the interaction between the induced currents $i_{bi}$, $i_{bi+1}$ and the magnetic field $B_{ai+1}$.

Incidentally, in the both end portions of the split armature coil, the electromagnetic force $F_{bi}$ and $F_{bi+1}$ are produced respectively by the interaction between the induced currents $i_{bi}$, $i_{bi+1}$ and the left magnetic fields $B_{bi}$, $B_{bi+1}$. However, the directions of the currents are the same and the directions of the magnetic fields are opposite to each other, thus the electromagnetic force $F_{bi}$ and $F_{bi+1}$ cancel out each other, and do not act as effective electromagnetic force. As a result, the coil $B_i$ and the coil $B_{i+1}$ provide the coil $M_{i+1}$ with induced currents only by means of the time change of each of the magnetic fields $B_{bi}$, $B_{bi+1}$. Thereafter, these operations are repeated.

Further, the same operation is performed for each of the coils $B_1$, $B_2$, ..., $A_{i-1}$, $B_{i+2}$, ..., $A_n$.

It should be noted that alternating current corresponding to the time constant of the LC circuit flows in each coil of the coil $A_i$ row and the coil $B_i$ row, and the direction of each generated magnetic field and each induced current are inverted. However, these magnetic fields and induced currents are synchronized at a switching timing of the silicon controlled rectifiers, and thus are controlled such that the direction of electromagnetic force is directed to one direction at all times.

Moreover, the current control device 4 of the present embodiment performs on/off control on each of the silicon controlled rectifiers such that an integration value (effective electromagnetic force) of the vector product between the effective magnetic field $B_{ai+1}$ formed in the coil $M_{i+1}$ by the coil $A_{i+1}$ and each of the induced currents $i_{bi}$, $i_{bi+1}$ applied to the coil $M_{i+1}$ by the coil $B_i$ and coil $B_{i+1}$ becomes maximum, and further performs excitation control so as to allow the coil $A_{i+1}$, coil $B_i$, and coil $B_{i+1}$ to have an electromagnetic phase difference.

As described above, the coil $A_i$ row and the coil $B_i$ row are disposed on the inner peripheral surface of the fan casing, and the coil $M_i$ row is disposed on the outer circumference of the fan so as to face the coil $A_i$ and the coil $B_i$, thus a configuration where heavy parts such as an iron core are not used is established, whereby the entire weight can be reduced significantly, and big torque can be produced with small electromagnetic force. Moreover, the coil $A_i$ row and the coil $B_i$ row are disposed on the inner peripheral surface of the fan casing, and the coil $M_i$ row is disposed on the outer circumference of the fan, such that in the coil $A_i$ row when one of the coils $M_i$ overlaps with a central portion of one of the coils $A_i$, a central portion of other coil $M_i$ overlaps with a central portion of other coil $A_i$, and end portions of the coil $M_i$ overlap with a separate coil $B_i$. Further, the current control device 4 preferably performs excitation control such that, when a coil $A_i$ overlaps with a central portion of a coil $M_i$, an effective magnetic field related to effective electromagnetic force for rotating the fan in a fixed direction is formed in each of the coils $M_i$, or, when a coil $B_i$ overlaps with either one of the end portions of a coil $M_i$, effective induced current related to the effective electromagnetic force is applied to the coil $M_i$. Moreover, the current control device 4 preferably performs excitation control on the coil $A_i$ and the coil $B_i$ so that the direction of the effective induced current and the direction of the effective magnetic field correspond to the direction of rotation of the fan. As a result, the effective electromagnetic force can be preferably produced without supplying current from outside to the coil $M_i$ row which is an armature coil, and the fan can be rotated in a fixed direction. In addition, the alternating current which excites the coil $A_i$ row and the coil $B_i$ row is collected in a forward or backward direction by the condenser, and caused to flow in the forward or backward direction again by the silicon controlled rectifiers, and loss portions of the alternating current is complemented in the charger. Since an iron core does not exist, magnetic loss such as hysteresis loss and eddy-current loss can be reduced. As a result, the magnetic energy of the coil $A_i$ row and the coil $B_i$ row is collected as an electrical energy by the condenser, and reused by the silicon controlled rectifiers. Therefore, the electromagnetic driving fan 100 has an energy collection function. Accordingly, the effective electromagnetic force for rotating the fan in a fixed direction can be preferably generated without consuming much of the electric power for exciting the coil $A_i$ row and coil $B_i$ row as the excitation coils, or with small electrical power consumption. As a result, the efficiency of the energy of the fan is improved significantly.

Embodiment 2

Figure 8:
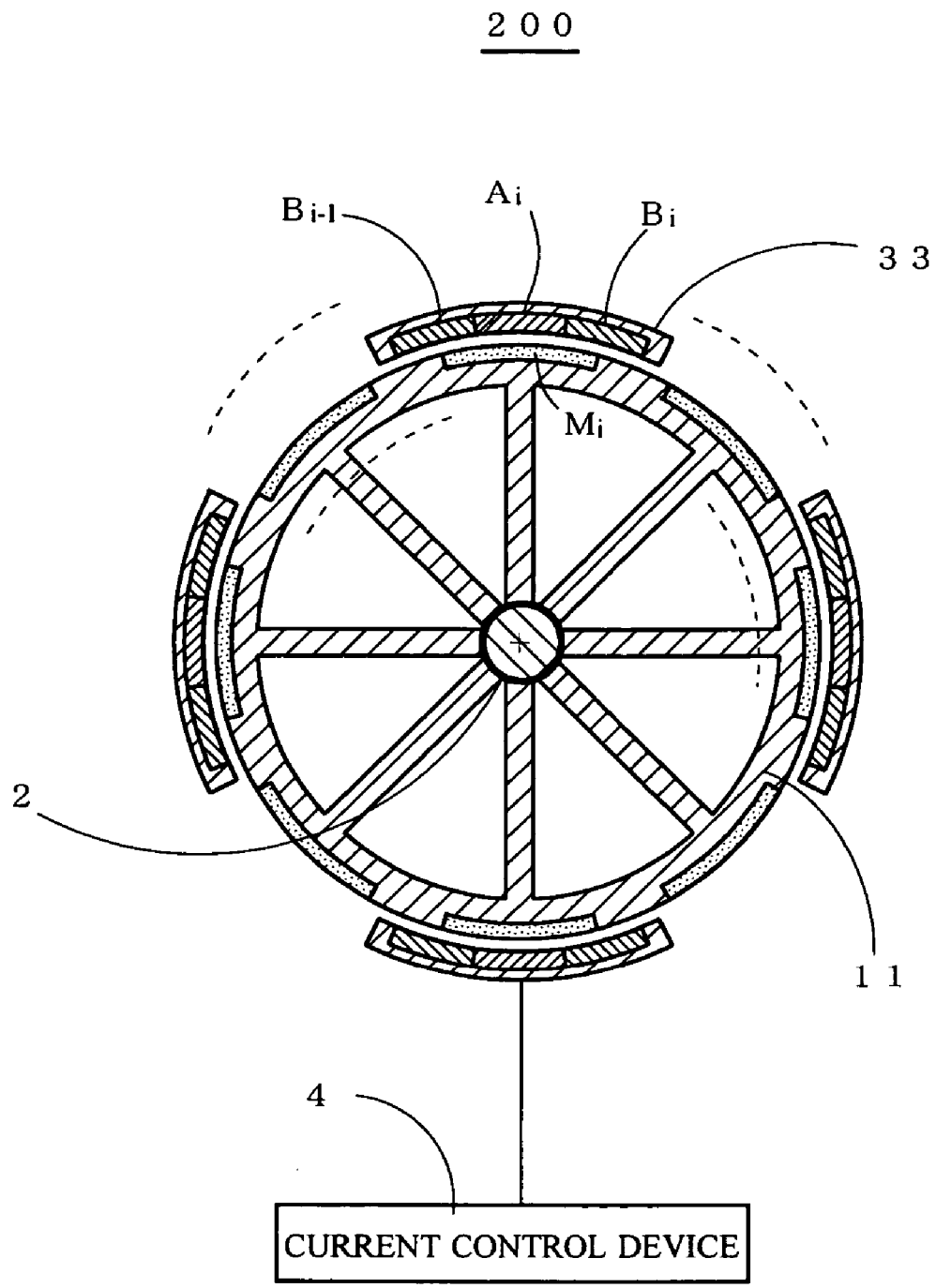
FIG. 8 is a cross-sectional view showing a substantial part of an electromagnetic rotating machine of other embodiment of the present invention.

FIG. 8 is a cross-sectional view showing a substantial part of an electromagnetic rotating machine 200 of other embodiment of the present invention.

The electromagnetic rotating machine 200 comprises a rotating structure portion 11 as a rotating body which is rotated by effective electromagnetic force, a shaft 2 to which the rotating structure portion 11 is attached, a fixed structure portion 33 as a fixed body which faces the rotating structure portion 11, a coil $A_i$ row as a split excitation coil which is attached to an inner peripheral surface of the fixed structure portion 33 so as to face an outer circumference of the rotating structure portion 11, and generates an effective magnetic field related to effective electromagnetic force for rotating the rotating structure portion 11, a coil $B_i$ row as a split excitation coil which applies effective induced current related to the effective electromagnetic force to a split armature coil which is described hereinbelow, a coil $M_i$ row as a split armature coil which is attached to the outer circumference of the rotating structure portion 11 and generates the effective electromagnetic force through an interaction between the effective magnetic field and the effective induced current, a current control device 4 which controls current for the coil $A_i$ and the coil $B_i$, and a position detection sensor (not shown) which detects an angle or displacement of the coil $M_i$.

Moreover, the abovementioned coil $M_i$ row may be disposed on the outer circumference of the rotating structure portion 11, and the abovementioned coil $A_i$ row and coil $B_i$ row may be disposed on the inner peripheral surface of the fan casing 3.

It should be noted that the coil $A_i$ row and coil $B_i$ row as the split excitation coils, and the coil $M_i$ row as the split armature coil perform the same operations as in Embodiment 1 to generate effective electromagnetic force and rotate the rotating structure portion 11, but in the electromagnetic rotating machine 200 the coil $M_i$ is disposed only on a part of the outer circumference of the rotating structure portion 11, and further the coil $A_i$ and coil $B_i$ are disposed in the fixed structure portion 33 so as to face the part of the outer circumference of the rotating structure portion 11. Therefore, effective electromagnetic force produced by a mutual induction effect of the coil $A_i$ and coil $B_i$ with respect to the coil $M_i$ acts intermittently to the rotating structure portion 11. Therefore, an average value of the effective electromagnetic force in the electromagnetic rotating machine 200 is smaller than that in the electromagnetic driving fan 100 of Embodiment 1.

In addition to the effects same as those in the electromagnetic driving fan 100 of Embodiment 1, the electromagnetic rotating machine 200 can cause the effective electromagnetic force to act intermittently on the rotating body. Therefore, the electromagnetic rotating machine 200 can be preferably applied to a large-diameter rotating machine which can rotate at low speeds such as, for example, a Ferris wheel, a belt conveyer, or other rotary drive sources.

The electromagnetic rotating machine of the present invention can be preferably applied to aircraft engines, electric motors or aircraft generators, other rotary driven machines, or systems that require these components.

What is claimed is:

1. An electromagnetic rotating machine comprising:
a rotating body and a fixed body, and driving the rotating body by using electromagnetic force which is produced by a mutual induction effect between an armature coil and an excitation coil,
wherein the armature coil is disposed on an outer circumference of the rotating body, and the excitation coil is disposed on an inner peripheral surface of the fixed body which the armature coil faces, and
wherein the excitation coil is configured from n ($\geqq 2$) numbers of split excitation coils, and the armature coil is configured from one or more split armature coils, the split armature coil intersecting in the vicinity of a central portion thereof and being closed coil that forms symmetry with respect to centerline including the intersection thereof, and the vicinity of a central portion of one of the split armature coils overlaps with the vicinity of a central portion of one of the split excitation coils so that the electromagnetic force is produced, and at that time the split armature coil overlaps with other split excitation coils at both sides of the split armature coil.

2. The electromagnetic rotating machine according to claim 1, wherein, when the vicinity of the central portion of one of the split armature coils overlaps with the vicinity of the central portion of one of the split excitation coils, the vicinity of a central portion of the other split armature coil overlaps with the vicinity of a central portion of the other split excitation coil.

3. The electromagnetic rotating machine according to claim 1 or 2, further comprising means for performing excitation control such that, when the vicinity of the central portion of the split armature coil overlaps with the vicinity of the central portion of the split excitation coil, the split excitation coil forms, in the split armature coil, an effective magnetic field related to effective electromagnetic force for rotating the rotating body, and, when either one of end portions of the split armature coil overlaps with the split excitation coil, the split excitation coil applies the split armature coil with effective induced current related to the effective electromagnetic force.

4. The electromagnetic rotating machine according to claim 3, further comprising means for performing excitation control such that the split excitation coil is energized with current when overlapping with either one of the end portions of the split armature coil, and an adjacent split excitation coil that overlaps with the other end portion of the split armature coil is energized with current in a direction opposite to that of the split excitation coil.

5. The electromagnetic rotating machine according to claim 4, further comprising means for performing excitation control on the split excitation coil such that a direction of force, which is generated as a result of the vector product between a vector of the effective magnetic field related to the effective electromagnetic force and formed in the split armature coil by one of the split excitation coils and a vector of effective induced current related to the effective electromagnetic force and applied to the split armature coil by the adjacent split excitation coils, corresponds with a direction of rotation of the rotating body.

6. The electromagnetic rotating machine according to claim 5, further comprising means for performing excitation control on the electromagnetic phase difference between the effective magnetic field formed in the split armature coil by one of the split excitation coils and the effective induced current applied to the split armature coil by the adjacent split excitation coils, such that an integration value between the effective magnetic field and the effective induced current is maximum.

7. The electromagnetic rotating machine according to claim 1, wherein the split excitation coil comprises current supply means for supplying alternating current, switching means for conducting the alternating current in two directions, accumulating means for collecting the alternating current, and a charger for complementing the alternating current, and constitutes a closed circuit.

8. The electromagnetic rotating machine according to claim 7, wherein the closed circuit constitutes an LC circuit, and a time constant of the LC circuit is set sufficiently small with respect to a rotation period of the rotating body.

9. The electromagnetic rotating machine according to claim 7, wherein the charger is a small motor generator, small gas turbine generator, fuel cell, superconducting generator, or a combination thereof.

10. The electromagnetic rotating machine according to any of claims 7 through 9, wherein the split excitation coil and the split armature coil are made from a conductive material of which electrical resistance is reduced to the minimum at a predetermined temperature or less, or which has a low electrical resistance.

* * * * *